Oct. 27, 1953      F. DANIELS      2,657,116
PROCESS FOR THE PRODUCTION OF NITROGEN OXIDES
Filed Jan. 28, 1949
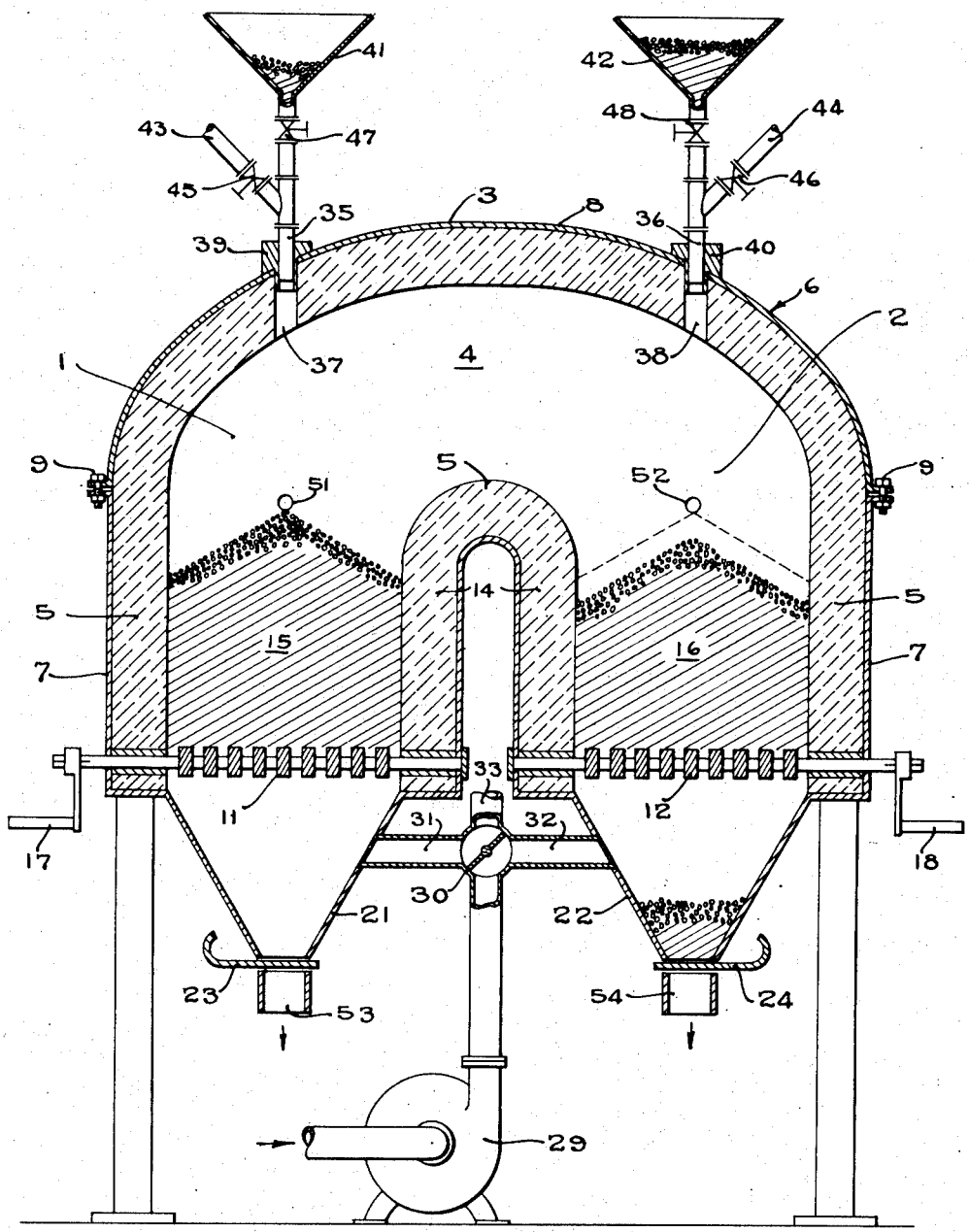
Inventor
FARRINGTON DANIELS Patented Oct. 27, 1953

2,657,116

UNITED STATES PATENT OFFICE 2,657,116

PROCESS FOR THE PRODUCTION OF NITROGEN OXIDES

Farrington Daniels, Madison, Wis., assignor to Wisconsin Alumni Research Foundation, a corporation of Wisconsin Application January 28, 1949, Serial No. 73,359

4 Claims. (Cl. 23—163)

The present invention relates to a process for the manufacture of nitrogen oxides; more particularly the present invention relates to a process for the manufacture of nitrogen oxides from the atmosphere by direct combination of nitrogen and oxygen.

When air or similar mixtures of nitrogen and oxygen are subjected to temperatures of the order of 2000° C., part of the nitrogen and oxygen react with one another to form nitric oxide, said reaction being generally termed "nitrogen fixation." The described reaction is reversible, however, and the newly formed nitric oxide will quickly decompose into its constituents, unless the temperature is rapidly reduced to materially lower levels at and below which the rate of decomposition is so slow as to be negligible. Thus, to recover nitrogen oxide for practical use, the reaction gases of the described process must be rapidly chilled to a sufficiently low temperature to stabilize the nitric oxides contained therein.

The high temperatures required for the fixation of atmospheric nitrogen may readily be established in the electric arc; for commercial purposes, however, the use of electric power for the fixation of nitrogen is usually too costly and could be practical only in regions where an abundance of electric power is available with no outlet for other uses. Efforts have therefore been made to employ inexpensive and readily available fuels in the manufacture of nitrogen oxides. However, the temperatures ordinarily attainable by the combustion of such fuels fall materially short of 2000° C., owing to the large heat capacity of the surrounding air, and can be raised to the required level only by thoroughly preheating the combustion air and/or enriching it with oxygen. In his U. S. Patent 2,422,081 Frederick G. Cottrell discloses methods and apparatus to meet this requirement while at the same time providing such rapid chilling rates for the newly formed nitric oxide as will reduce decomposition thereof to a tolerable minimum. According to said patent the hot reaction gases produced in the combustion zone of a furnace are passed through a bed of heat-absorbing pebbles of a refractory material that chill the gases and are themselves heated in the process; after the pebbles in the bed have become heated to a sufficiently high extent, the direction of the process is reversed, that is, the fresh air is delivered to the combustion zone through the newly heated pebble bed while the reaction gases are discharged through another pebble bed located at the opposite side of the combustion zone. As the air passes through the heated bed, it rapidly absorbs heat and thus arrives at the combustion zone in pre-heated condition so that the temperatures developed in said zone are materially raised. Consequently the reaction gases escaping through the opposite pebble bed heat said bed to a higher temperature than that previously reached by the first mentioned pebble bed so that subsequent supply of the combustion air through said second pebble bed will raise the temperature of the combustion zone still further. Thus, by continually reversing the direction of the air supply in the manner described, the temperature in the combustion zone may readily be raised to the required level of about 2000° C. at and above which nitric oxide is produced in commercially useful quantities, and thereafter the combustion zone temperature may be maintained at said level by a properly proportioned fuel supply and by properly timed reversals in the direction of the air supply.

As first recognized by Cottrell, the described arrangement is of particular aptitude in processes for the thermal fixation of nitrogen, since the reaction gases formed in its combustion zone are always discharged through a pebble bed which has been chilled in the immediately preceding half-cycle of the process by the intake of cool air; in consequence, said reaction gases are chilled with such rapidity that the nitrogen oxides entrained therein are stabilized before they have a chance to decompose. For the pebble beds to perform effectively as rapidly acting chilling media they must be constructed to offer a large contact surface to the passing gases. The above mentioned Cottrell patent discloses that beds composed of refractory pebbles of a size presenting at least 22 square feet of surface area per cubic foot of volume perform in the required manner, and practical operation of the Cottrell process has demonstrated that it produces near equilibrium yields of nitric oxide at reaction temperatures of about 2000° C. and above, and at the same time provides such effective chilling of the effluent combustion gases that most of the nitric oxide formed in the reaction zone may be recovered for practical use.

The duration of successful operation of the above described process has been limited by the quality of the refractories from which the heat-exchanging pebbles were made, and the performance of the process improved with improvements in the quality of the refractories employed in the construction of said pebbles. Thus far, however, commercially satisfactory results have been obtained for relatively short periods of time only. As the operating periods were extended, it became first apparent that increasingly greater pressures were required to force the necessary air supply into the combustion zone, and increasing pressure differentials were measured between said combustion zone and the ends of the pebble beds. Eventually, however, said pressure differentials dropped abruptly to subnormal values followed by a marked decrease of the furnace temperature and a rapid deterioration of productivity to an extent that rendered continuance of the process scarcely profitable. It was found that the pebbles, though made of refractory materials of the highest quality, were unable to stand prolonged exposure to the exceedingly high temperatures of the combustion zone and to the rapid temperature changes caused by the alternating passage of the hot reaction gases and the cool combustion air. Large strata of pebbles had grown into clusters that were practically impervious to the flow of air, especially in regions near the combustion zone. Closer examination revealed that the surfaces of the pebbles were covered with crystal deposits which knitted them together and restricted the interstitial passages; furthermore, spalling had occurred and it was observed that the pebbles had somewhat shrunk in size. Evidently the pebbles adjacent to the combustion zone had partially sublimed under the influence of the intense heat to which they were subjected, and a portion of the sublimed refractories had condensed upon the surfaces of the more remote and therefore cooler pebbles forming the entwining crystal growth that obstructed the shrinking interstitial passages. Eventually the obstructions had reached a degree where the pressure of the air supplied to the combustion zone had forced a direct channel through the pebble bed enabling the entrant air to by-pass the preheating action of the pebbles and permitting the existing reaction gases to escape without proper chilling. As a result, the temperature of the reaction zone had dropped below the level required for nitrogen fixation to occur in commercially useful quantities and/or the chilling efficiency of the beds had deteriorated to an extent permitting prohibitively large percentages of the nitric oxide to decompose.

The present invention concerns an improvement of the described process for the thermal fixation of nitrogen, which makes it possible to continue operation thereof under conditions of high efficiency over several times the periods formerly possible, without depending upon the use of specially developed refractories.

Broadly it is an object of the present invention to provide a commercially practicable method for manufacturing nitrogen oxides in regenerative furnaces of the pebble-bed type.

More specifically it is an object of this invention to provide a method of manufacturing nitrogen oxides, in regenerative furnaces, that may be effectively continued over extended periods of time.

It is another object of the present invention to provide a thermal process for the fixation of atmospheric nitrogen employing pebble bed regenerators, that preserves the effectiveness of said pebble bed regenerators over extended periods of time.

It is yet another object of my invention to provide an improved method, of the type referred to, that may be continued under conditions of high efficiency over several times the period formerly possible, while using pebbles made from the same refractories.

Additionally, it is an object of this invention to provide a method for preventing congestion of pebble bed regenerators employed in thermal processes for the fixation of atmospheric nitrogen.

Furthermore, it is an object of this invention to provide a method for limiting crystal growth on the surfaces of the pebbles in the pebble beds of regenerative nitrogen fixation furnaces.

It is still another object of the invention to provide a method for preventing crystal growth on the surfaces of pebbles, in pebble beds of the type referred to, from knitting large numbers of said pebbles into coherent clusters.

Moreover, it is an object of this invention to provide a method for limiting the harmful effects of spalling and shrinkage of the pebbles employed in the pebble bed regenerators of nitrogen fixation furnaces.

Furthermore, it is an object of this invention to provide a nitrogen-fixation process, of the type referred to, which is adapted to maintain the preheating and chilling efficiencies of the pebble beds involved over prolonged periods of uninterrupted performance.

These and other objects of my invention will be apparent from the following description of an exemplary embodiment thereof.

In accordance with my invention, I conduct atmospheric air, or a similar mixture of nitrogen and oxygen, through pebble bed regenerators to and away from an intermediate combustion zone heated to temperatures of the order of 2000° C. or above and I continually rejuvenate said pebble bed regenerators by removing deteriorated pebbles and adding fresh pebbles at opposite ends of said pebble bed regenerators.

The furnace illustrated in the accompanying drawing comprises a pair of adjacently positioned chambers 1 and 2 that may be of a cylindrical shape and the open upper ends of which may be covered by a dome-shaped roof 3 rising sufficiently high above said chambers to form a connecting passage 4 which constitutes the actual combustion chamber of the furnace. The walls 5 of the furnace may be formed by refractory bricks, such as bricks made from dense magnesium oxide or stabilized zirconium oxide, and the total structure is encased in a gas-tight steel shell 6. Said shell may be composed of a lower section in the form of a cylindrical channel 7 and an arched upper section 8 which is securely bolted to said lower section as indicated at 9. While the accompanying drawing illustrates the steel shell 6 as tightly embracing the refractory furnace structure, said shell is preferably made of a somewhat larger diameter than the refractory structure to leave space for a packing of insulating material (not shown). At their lower ends the chambers 1 and 2 are provided with suitable dumping grates 11 and 12, respectively, upon which are supported pebbles of a refractory material, such as magnesium oxide or stabilized zirconium oxide of high purity. Said pebbles fill the chambers 1 and 2 to almost the height of the intermediate wall structure 14 to form heat-exchanging pebble beds of a substantial depth which are identified with the numerals 15 and 16 in the accompanying drawing. The individual pebbles are preferably of spherical or spheroidal shape ranging from ½" to 1" in diameter. The dumping grates 11 and 12 possess individual manipulating handles 17 and 18, respectively, to permit independent actuation, and below each grate the lower section 7 of the steel shell 6 is formed in the manner of hoppers 21 and 22, respectively, which are fitted with slide gates 23 and 24.

A motor-driven blower 29 delivers air into the described furnace structure through a reversing valve 30 which controls two conduits 31 and 32 that lead into the hoppers 21 and 22, respectively. In addition, the reversing valve 30 communicates with an exhaust line 33 that leads to a nitrogen-oxide-recovery-system (not shown). The construction of the reversing valve 30 is such that when it is set to connect the blower 29 to the conduit 31 and hence directs the blast of air through the pebble bed 15, it connects the conduit 32 to the exhaust line 33 and thus directs reaction gases descending through the pebble bed 16 to the above mentioned recovery system. Vice versa, when the valve 30 is set to connect the blower 29 to the conduit 32 and hence directs the air blast through the pebble bed 16, it connects the conduit 31 to the exhaust line 33 so that the reaction gases descending through the pebble bed 15 may reach the recovery system.

Fuel is supplied to the furnace through a pair of pipes 35 and 36 which protrude into suitable apertures 37 and 38 provided in the roof structure 3 and 8 in vertical axial alignment with the cylindrical chambers 1 and 2. Said pipes 35, 36 terminate a distance above the inner surface of the roof, as shown, so that their orifices are shielded from the intense heat prevailing in the furnace during its operation, and the space between said pipes and the walls of their respective inlets is hermetically sealed by suitable packing glands 39 and 40. The pipes 35 and 36 are adapted to deliver pebbles as well as fuel into the furnace, and for this purpose the upper ends of said pipes are extended in the manner of funnels, as indicated at 41 and 42, to facilitate introduction of the pebbles, while fuel is supplied into said pipes through lateral conduits 43 and 44. Said conduits are provided with fuel control valves 45 and 46, respectively, and valves 47 and 48 are fitted into the pipes 35 and 36 above their junctions with the fuel conduits to control the flow of fresh pebbles into the furnace.

In carrying out the process of my invention in the above described apparatus, both the pebble-supply valves 47 and 48 should be closed; the reversing valve 30 may first be set to deliver the blast of air produced by the blower 29 into the hopper 22 and through the pebble bed 16. The fuel supply valve 46 is opened to deliver a suitable fluid fuel, such as natural gas, from a source (not shown) under pressure into the furnace where it mixes with the air ascending through the pebble bed 16, is ignited in some suitable manner, and burns, the resultant combustion gases descending through the pebble bed 15 into the hopper 21 from where the conduit 31 conducts them through the reversing valve 30 into the exhaust line 33. As the hot combustion gases traverse the pebble bed 15, the upper pebble layers absorb their heat and, as the process is continued, successively lower pebble layers become hot until the pebble bed is heated through practically its total depth. At this point the fuel supply valve 46 is shut, the fuel supply valve 45 is opened, and the position of the direction-control valve 30 is reversed, so that the air supply is now passed through the heated pebble bed 15. As the air rises through said bed, it absorbs the heat from the pebbles thereof and arrives at the combustion zone in pre-heated condition. Consequently, materially higher combustion temperatures are produced than were obtained during the first phase of the process when the air supply was at room temperature. Accordingly, the combustion gases descending through the right-hand pebble bed 16 progressively heat the layers of said bed to higher temperatures than those to which the left hand pebble bed was heated during the initial phase of the process. As the left-hand pebble bed continues to preheat the cool air supplied by the blower 29, successively higher pebble layers of said bed are chilled, and by the time said bed has lost its ability properly to preheat the air supply, the direction-control valve 30 is again manipulated to reverse the operation of the furnace, and the fuel supply valve 45 is closed while the fuel supply valve 46 is re-opened. In ascending through the right-hand pebble bed, the air supply will now be pre-heated to an even greater extent than during the preceding phase of operations, resulting in a further increase in the temperature developed in the combustion zone. By repeating the described reversals a suitable number of times the temperature in the furnace may be raised to a level of say 2200° C. with a potential production of from 2% to 3% of nitric oxide. Thereafter, the temperature in the furnace may be maintained at this level by appropriate timing of said reversals together with appropriate control of the fuel supply. In timing the reversals care should be taken that the temperature of the reaction gases discharged from the lower ends of the pebble beds never be allowed to rise above a suitable level selected to keep the heat losses of the process at a minimum and safeguard the grates 11 and 12 from premature destruction.

In accordance with my invention pebbles are removed from the bottom of the pebble beds at predetermined intervals during the operation of the furnace, and a corresponding quantity of fresh pebbles is added each time at the top of said beds. For this purpose the blower 29 may be shut off and the operating fuel supply conduit be closed at a time when the direction of the air supply is about to be reversed. With the operation of the furnace thus momentarily interrupted, the dumping grate below the pebble bed that acted as preheater during the last half-cycle is actuated to dump a minor portion of the pebbles amounting to no more than a few layers into the hopper underneath. In the drawing the right-hand pebble bed 16 illustrates this stage in the process of the invention, part of its pebbles having been dumped into the hopper 22 causing a slight drop in its stockline below its normal level. As the next step the control valve 48 below the funnel 42 is opened to deliver an amount of pebbles substantially equal to the amount dumped into the hopper 22 onto the upper face of the pebble bed 16 and thus restore its stockline to its proper level. To maintain the pebble beds accurately at their normal depths, peep holes 51 and 52 may be provided in the furnace wall to permit visual control of the described operations, or the amount of pebbles dumped into a hopper may every time be carefully weighed and the same weight of fresh pebbles be deposited into the funnel above the respective pebble bed. With the pebble bed 16 thus partially replaced, the reversing valve 30 is set to a position in which it directs the air supply through the left-hand pebble bed 15, whereupon operation of the furnace may be resumed by starting the blower 29 and opening the fuel supply valve 45; the replenished pebble bed with its fresh top layer of pebbles will now act as chilling medium for the reaction gases over the next half-cycle of the process. After another predetermined period of operation, the process is again briefly interrupted to refresh the left-hand pebble bed in like manner, and by repeating the described replacing operations at predetermined intervals the pebbles in both beds will all be gradually replaced and the beds may be kept in a continuous process of rejuvenation. The rate at which the pebbles pass through the chambers 1 and 2 should be adjusted so that crystal accumulation on the pebble surfaces is unable to occur to any extent that will harmfully interfere with the operation of the process; said rate may also be adjusted to keep spalling and shrinkage of the pebbles within permissible limits, and it will necessarily vary depending upon the materials from which the pebbles are comprised and on the temperature levels maintained within the furnace. It should be noted, however, that excessive speeds in the exchange of the pebbles are apt to cause pebble breakage, and the rate at which the pebbles are exchanged should therefore be held at the minimum compatible with the previously mentioned requirements.

By actuation of the slide gates 23 and 24 the deteriorated pebbles collecting in the hoppers 21 and 22 may be dropped into suitable chutes 53 and 54, which may be arranged to carry them to a reconditioning system (not shown) where they are screened and cleared from crystal deposits. The re-conditioned pebbles may then be lifted into the funnels 41 and 42 to be reintroduced into the furance during subsequent bed-refreshing operations.

With the pebbles thus circulated through the furnace from the top to the bottom of the beds, and then reconditioned and returned to the top of the beds, as provided for in accordance with by invention, nitrogen oxides may be produced in regenerative furnaces of the pebble-bed type with cheap and readily available fuels in continuous runs lasting over many months, with the preheating and chilling functions of the pebble beds maintained at top efficiencies so that there will be no appreciable deterioration in the productivity of the process. Crystal accumulations and other harmful changes in the condition of the pebbles are kept within permissible limits, and there is no danger of break-downs due to pebble bed "blow-out."

While the replenishment of the pebble beds by the introduction of fresh pebbles through the pipes 35, 36 has been described as occuring after a quantity of deteriorated pebbles has been removed from the bottom of the beds, it will be understood that the new pebbles may be delivered onto the upper surface of the pebble beds coincident with the removal of the deteriorated pebbles from the bottom thereof. Also, while the withdrawal of the deteriorated pebbles from the pebble beds and the introduction of fresh pebbles into the furnace has been described as occurring preferably at a moment after the particular pebble bed to be rejuvenated has acted as a preheater and before it is to act as a chilling medium, it will be understood that the deteriorated pebbles may be withdrawn from, and the fresh pebbles added to, a bed while it is traversed by the entrant combustion air, or vice versa while it is traversed by the effluent combustion gases. In fact, the arrangement may be such that there is a continuous flow of pebbles onto the upper surface of the beds while old pebbles are continuously withdrawn from the bottom so that the process need not even be momentarily interrupted. It will also be understood that automatically operating mechanisms may be provided to perform the above described operations for refreshing the pebble beds.

Furthermore, while I have described my invention as carried out in a particular furnace, it will be understood that I do not wish to be limited to the constructional details of the furnace shown or described, which may be departed from without departing from the spirit and scope of my invention. Thus, the furnace chambers 1 and 2 may be of rectangular rather than circular cross section, and more than a single fuel inlet pipe may be provided above each pebble bed. Also, the fresh pebbles may be fed into the furnace through separate inlets instead of being introduced through the fuel inlet pipes, and said pebble inlets may be located in places other than the furnace roof, such as the side walls of the furnaces; similarly the fuel inlet pipes, if they are separate from the pebble inlets, may be located in the side walls of the furnace instead of the roof, or may even be constructed to extend upwardly through the pebble beds; moreover, the furnace need not necessarily be of the cross-over type illustrated in the accompanying drawing, but may be of the well-known monolithic construction in which the pebble beds and the intermediate combustion zone are vertically superposed. Furthermore, while the process of my invention is of particular advantage in the manufacture of nitrogen oxides with cheap and readily available fuels, such as fuel gases or fuel oils, the thermal energy required in the reaction zone may also be supplied by the combustion of powdered coal, electric energy, or the like.

Having thus described my invention and the manner in which it is performed, what I claim is:

1. The process of manufacturing nitrogen oxides from a mixture comprising essentially nitrogen and oxygen, which comprises successively passing said mixture through a first bed of hot refractory pebbles to preheat said mixture, a reaction zone heated to nitrogen fixing temperatures to cause formation of nitric oxide and a second bed of refractory pebbles in relatively cool condition to chill and stabilize the nitric oxide formed in said reaction zone; reversing the direction of flow periodically whenever a second pebble bed has absorbed sufficient heat to properly preheat said entrant mixture and a first pebble bed has lost heat to an extent enabling it to properly chill said nitric oxide, and slowly and continually removing pebbles from and adding fresh pebbles to said beds while said mixture passes through said reaction zone maintained substantially at said nitrogen fixing temperatures and the nitrogen oxides thereby produced are chilled in one of said pebble beds, to inhibit crystal growth on the pebbles within the beds and thus maintain the productivity of the nitric oxide formation process for prolonged periods of time.

2. The process according to claim 1 wherein said mixture is air.

3. The process of manufacturing nitrogen oxides from a mixture comprising essentially nitrogen and oxygen, which comprises successively passing said mixture through a first bed of hot refractory pebbles to preheat said mixture, a confined reaction zone heated to temperatures of the order of 2000° C. to cause formation of nitric oxide, and a second bed of refractory pebbles in relatively cool condition to chill and stabilize the nitric oxide formed in said reaction zone; reversing the direction of flow periodically whenever a second pebble bed has absorbed sufficient heat to properly preheat said entrant mixture and a first pebble bed has lost heat to an extent enabling it to properly chill said nitric oxides, moving the pebbles slowly in said pebble beds in a direction away from said reaction zone by continually removing pebbles from said beds at points remote from said reaction zone and adding fresh pebbles to said beds at points adjacent to said reaction zone, while said mixture passes through said reaction zone maintained substantially at said nitrogen fixing temperatures and the nitrogen oxides thereby produced are chilled in one of said beds, to inhibit crystal growth on the pebbles in the beds and thus maintain the efficiency of the nitric oxide formation process for prolonged periods of time.

4. The process according to claim 3 wherein said mixture is air.

FARRINGTON DANIELS.

References Cited in the file of this patent

UNITED STATES PATENTS

| Number | Name | Date |
|---|---|---|
| Re. 19,757 | Royster | Nov. 12, 1935 |
| 2,121,733 | Cottrell | June 21, 1938 |
| 2,421,744 | Daniels et al. | June 10, 1947 |
| 2,422,081 | Cottrell | June 10, 1947 |
| 2,432,873 | Ferro et al. | Dec. 16, 1947 |
| 2,443,210 | Upham | June 15, 1948 |
| 2,482,438 | Robinson | Sept. 20, 1949 |
| 2,512,442 | Norton | June 20, 1950 |
| 2,520,164 | Norton | Aug. 29, 1950 |
| 2,625,463 | Norton | Jan. 13, 1953 |

OTHER REFERENCES

Schmidt et al., "Chem. Engineering Progress," vol. 44, No. 10, pages 737–744, Oct. 1948.